United States Patent [19]
Schmidt et al.

[11] Patent Number: 6,148,325
[45] Date of Patent: *Nov. 14, 2000

[54] METHOD AND SYSTEM FOR PROTECTING SHARED CODE AND DATA IN A MULTITASKING OPERATING SYSTEM

[75] Inventors: Michael A. Schmidt; Jonathan G. Thomason, both of Redmond; Scott M. Cutshall, Carnation, all of Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/268,442

[22] Filed: Jun. 30, 1994

[51] Int. Cl.⁷ ............................... G06F 9/00; G06F 9/40
[52] U.S. Cl. ........................... 709/107; 712/227; 710/200
[58] Field of Search ..................... 395/650, 700, 395/600, 673, 674; 709/100, 102, 105, 106, 107; 712/227; 710/200

[56] References Cited

U.S. PATENT DOCUMENTS

| | | | |
|---|---|---|---|
| 4,945,470 | 7/1990 | Takahashi | 364/200 |
| 5,481,706 | 1/1996 | Peek | 395/650 |
| 5,487,158 | 1/1996 | Amelina et al. | 395/375 |
| 5,490,256 | 2/1996 | Mooney et al. | 395/375 |

FOREIGN PATENT DOCUMENTS

| | | | |
|---|---|---|---|
| 0 381 655 | 8/1990 | European Pat. Off. | G06F 9/46 |

OTHER PUBLICATIONS

*Windows NT™ Resource Guide: Microsoft® Windows NT™ Preliminary Release*, Microsoft Press, Redmond, Washington 1993.

*Microsoft® Win32™ Preliminary Software Development Kit for Windows NT™ Programmer's Reference: Overviews*, Microsoft Corporation, Redmond, Washington 1992.

Bottazzi, M. and C. Salati, "A Hierarchical Approach to Systems with Heterogeneous Real–Time Requirements," *The Journal of Real–Time Systems* 3(2):149–163, 1991.

"Sixteen–to Thirty–Two–Bit Operating System Compatibility Method for Personal Computers," *IBM Technical Disclosure Bulletin* 34(4B):314–317, Sep. 1991.

*Microsoft® Win32™ Preliminary SDK for Windows NT™, Programmer's Reference: Overviews*, Microsoft Corporation, 1992, pp. 79–95.

*Windows NT Resource Guide, Microsoft® Windows NT™ Preliminary Release*, Microsoft Corporation, 1993, pp. 23–29.

"How Windows NT Deserializes Input," *Advanced Windows NT*, 1992–1995, pp. 1–4.

(List continued on next page.)

*Primary Examiner*—Majid A. Banankhah
*Attorney, Agent, or Firm*—Workman Nydegger & Seeley

[57] ABSTRACT

A method and system for protecting shared code and data, in particular, shared system code and data, in a multitasking operating system are provided. The operating system includes a cooperative subsystem and a preemptive subsystem. The cooperative subsystem includes shared system code and data. The method and system include a synchronization mechanism for controlling access to the shared system code and data by threads. Ownership of the synchronization mechanism must be requested and obtained before a cooperatively scheduled thread can execute in the cooperative subsystem. Additionally, ownership of the synchronization mechanism must be requested and obtained before a preemptively scheduled thread can execute the shared system code in the cooperative subsystem. If the synchronization mechanism is already owned, the requesting thread is blocked until ownership is released. Otherwise, the requesting thread is granted ownership. Since no other thread can obtain ownership of the synchronization mechanism while one thread owns the synchronization mechanism, the shared system code and data in the cooperative subsystem is protected.

13 Claims, 5 Drawing Sheets

OTHER PUBLICATIONS

Walter, Mix 16–bit and 32–bit code in the applications with the Win32s universal thunk, computer select Nov. 1993.

16 to 32 bit operating system compatibility method of personal computers, IBMTDB Sep. 1991.

DECOSF/1, Reference Pages Section 3—Routines vol. 2, 1993–1994 pthread–80.

Memory Protection Software Facility for OS/2 Shared Data Applications IBMTDB, Sep. 1991 V34 NR 4A pp. 81–89.

Cooper et al, C Threads, Carnegie Mellon University, Sep. 11, 1990.

"Explore the Depth and Impact of OS/2's New 32–bit AP2" by Duncan, Ray PC Magazine V9, n11, p. 359(4) Jun. 12, 1990.

"Examining the Development of Semaphore in OS/2" by Duncan, Ray PC Magazine v9, n15, p. 115(4), Sep. 11, 1990.

"Willow Without Weeping" Marshall, Andrew. EXE, V5, n11, p. 48(4) May 1991.

"Cross–Platform Communication Classes" by Lam, Richard B. Dr. Dobb's Journal, Mar. 1995.

"OS/2 2.0 Application Design Guide"by IBM Technical Library, Published by QUC 1992.

METHOD AND SYSTEM FOR PROTECTING SHARED CODE AND DATA IN A MULTITASKING OPERATING SYSTEM

FIELD OF THE INVENTION

This invention relates generally to multitasking operating systems and, more particularly, to a method and system for protecting shared code and data in a multitasking operating system.

BACKGROUND OF THE INVENTION

Many operating systems support multitasking. A task is a stand-alone application program or a subprogram that is run as an independent entity. Multitasking is the ability of a computer system to have more than one task in memory at a time and to switch which task the CPU is currently executing to improve the efficiency of the computer system's components. Multitasking operating systems provide mechanisms for protecting shared code and data. Shared code is code that can be executed by more than one task, and shared data is data that can be accessed by more than one task. The mechanisms provided by multitasking operating systems prevent problems associated with code sharing and data sharing. Code sharing and data sharing problems can arise if one task has modified shared code or the data that the shared code manipulates and another task begins or continues execution of the shared code after the shared code or its data has been modified. The task that has begun or continued execution of the shared code after modification of the code or its data can get unexpected results due to the modifications to the code or its data.

One type of multitasking operating system is a non-preemptive, or cooperative, multitasking operating system. A cooperative multitasking operating system requires cooperation between the tasks in order for the computer system to function properly. With such an operating system, once a first task has been assigned control of the CPU, all other tasks are blocked (i.e., prevented from gaining control of the CPU) until the first task relinquishes control of the CPU. Thus, shared code and data are inherently protected in such an operating system. Specifically, since control of the CPU cannot be taken away from a task once it has been assigned, it is impossible for one task to have modified shared code or its data and another task to begin or continue execution of the shared code after the shared code or its data has been modified. The task that has been assigned control of the CPU will not relinquish control of the CPU until the task has completed execution of the shared code.

Another type of multitasking operating system is a preemptive multitasking operating system. Unlike a cooperative system, a preemptive multitasking operating system does not require cooperation between the tasks in order for the computer system to function properly. With such an operating system, the system assigns control of the CPU to a task and then takes back control from the task when a specified time expires or a specified event occurs. Thus, shared code and data are not inherently protected in such an operating system. For example, one task may have modified shared code or its data when the operating system takes back control of the CPU from the task. Subsequently, another task may be assigned control of the CPU and may begin or continue execution of the shared code after the shared code or its data has been modified. As a result, this situation can lead to the code sharing and data sharing problems discussed above.

SUMMARY OF THE INVENTION

One aspect of the present invention provides a method and system for protecting shared code and data, in particular, shared system code and data, in a multitasking operating system. The operating system includes a cooperative subsystem and a preemptive subsystem. The cooperative subsystem includes shared system code and data. The method and system include a synchronization mechanism for controlling access to the shared system code and data by threads. Ownership of the synchronization mechanism must be requested and obtained before a cooperatively scheduled thread can execute in the cooperative subsystem. Additionally, ownership of the synchronization mechanism must be requested and obtained before a preemptively scheduled thread can execute the shared system code in the cooperative subsystem. If the synchronization mechanism is already owned, the requesting thread is blocked until ownership is released. Otherwise, the requesting thread is granted ownership. Since no other thread can obtain ownership of the synchronization mechanism while one thread owns the synchronization mechanism, the shared system code and data in the cooperative subsystem are protected.

DETAILED DESCRIPTION OF THE PREFERRED EMBODIMENT

The preferred embodiment of the present invention provides a method and system for protecting shared code and data, in particular, shared operating system code and data, in a multitasking operating system. The method and system include a synchronization mechanism that protects shared system code and data in the multitasking operating system. The operating system includes a cooperative subsystem and a preemptive subsystem. The cooperative subsystem includes the shared system code and data. As will be described in greater detail below, ownership of the synchronization mechanism must be requested and obtained before a cooperatively scheduled thread can execute in the cooperative subsystem. Additionally, ownership of the synchronization mechanism must be requested and obtained before a preemptively scheduled thread can execute the shared system code in the cooperative subsystem. The synchronization mechanism of the present invention provides compatibility in an operating system that includes both a cooperative subsystem and a preemptive subsystem by protecting the shared code and data in the cooperative subsystem from the preemptive capabilities of the preemptive subsystem.

Figure 1:
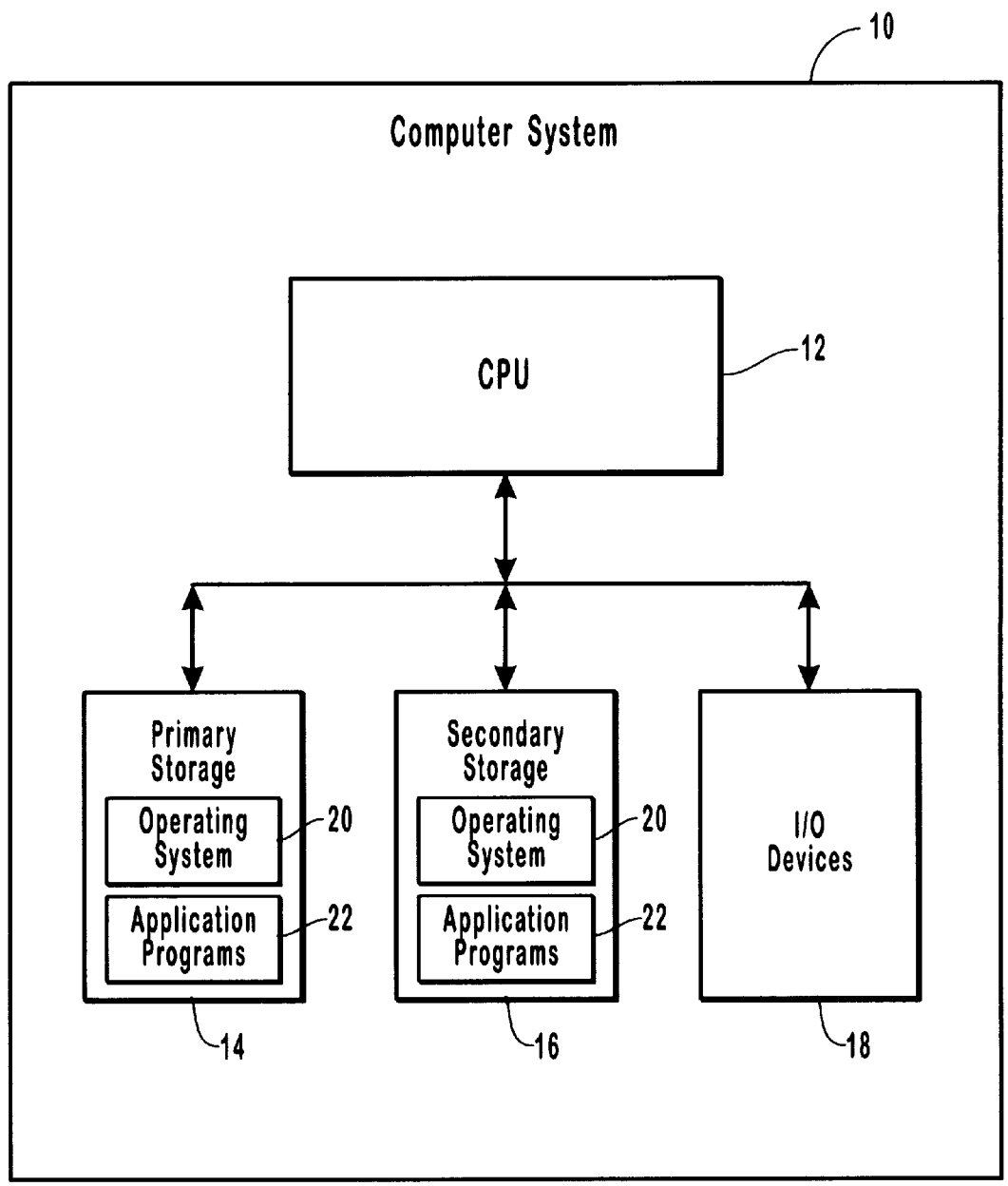
FIG. 1 is a block diagram that illustrates the components of a computer system in which the preferred embodiment of the present invention operates.

A computer system 10 in which the preferred embodiment of the present invention operates is illustrated in FIG. 1. The computer system 10 includes a central processing unit ("CPU") 12, a primary storage 14, a secondary storage 16, and input/output ("I/O") devices 18. An operating system 20 and application programs 22 are stored in the secondary storage 16 and are loaded into the primary storage 14 for execution by the CPU 12. A program, such as an application program 22, that has been loaded into the primary storage 14 and prepared for execution by the CPU 12 is called a process. A process includes the code, data, and other resources that, belong to a program. A path of execution in a process is called a thread. A thread includes a set of instructions, related CPU register values, and a stack. A process has at least one thread. In a multithreaded operating system, a process can have, more than one thread. The thread is the entity that receives control of the CPU 12.

Figure 2:
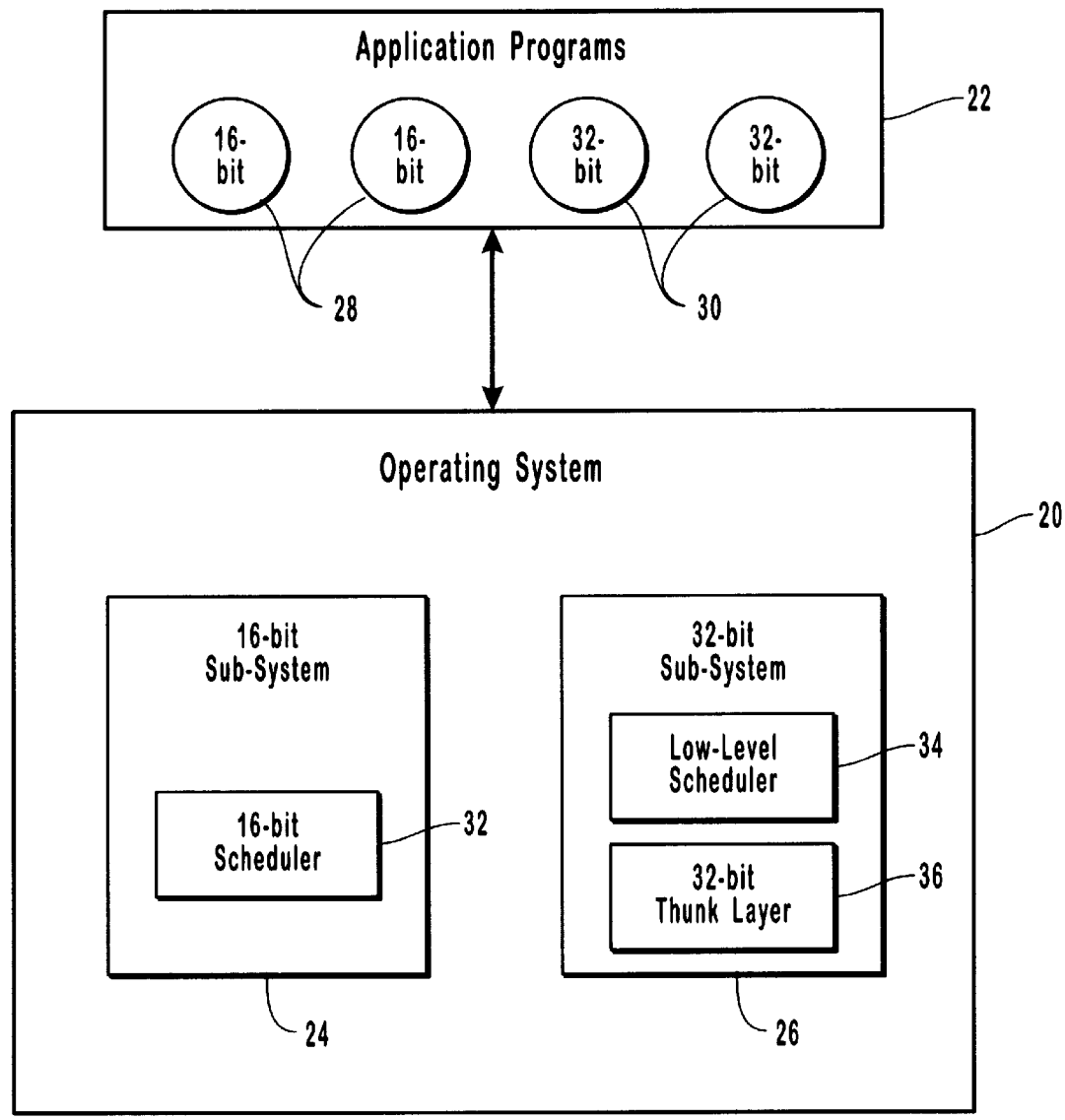
FIG. 2 is a block diagram that illustrates in more detail the components of the operating system of FIG. 1.

The components of the operating system 20 are illustrated in FIG. 2. In the preferred embodiment of the present invention, the operating system 20 includes a cooperative multitasking -subsystem 24 and a preemptive multitasking subsystem 26. Additionally, the cooperative multitasking subsystem 24 is a 16-bit system (and will be referred to as the "16-bit subsystem") and the preemptive multitasking subsystem 26 is a 32-bit system (and will be referred to as the "32-bit subsystem"). Thus, the application programs 22 include both cooperatively scheduled 16-bit applications 28 and preemptively scheduled 32-bit applications 30. The operating system 20 is an enhanced version of the "MICROSOFT WINDOWS," version 3.1, operating system (hereinafter referred to as "WINDOWS 3.1"), sold by Microsoft Corporation of Redmond, Wash. WINDOWS 3.1 is a cooperative multitasking operating system. The operating system 20 in the preferred embodiment of the present invention provides a preemptive multitasking subsystem as an enhancement to the cooperative multitasking subsystem provided by WINDOWS 3.1. Such an enhanced version provides compatibility between applications written for earlier cooperative systems and applications written for more recent preemptive systems. While the present invention is being described with reference to an enhanced version of WINDOWS 3.1, those skilled in the art will appreciate that other operating systems may be used to practice the present invention. The choice of an enhanced version of WINDOWS 3.1 is merely illustrative.

The 16-bit subsystem 24 includes a 16-bit application programming interface ("API") that enables the 16-bit applications 28 to request and carry out low-level services provided by the operating system 20. Similarly, the 32-bit subsystem 26 includes a 32-bit API that enables the 32-bit applications 30 to request and carry out low-level services provided by the operating system 20. Furthermore, the 16-bit subsystem includes a 16-bit scheduler 32 that is responsible for handling the cooperative scheduling of the 16-bit applications 28, and the 32-bit subsystem 26 includes a low-level scheduler 34 that is responsible for handling the preemptive scheduling of the 32-bit applications 30. Such a 16 bit scheduler is provided by the "MICROSOFT WINDOWS," version 3.1, operating system, and such a low-level scheduler is provided by the "MICROSOFT WINDOWS NT" operating system, sold by Microsoft Corporation of Redmond, Wash.

When a 16-bit application 28 calls a 16-bit API function, the call is handled directly by the 16-bit subsystem 24. When a 32-bit application 30 calls a 32-bit API function, however, the call is generally not handled directly by the 32-bit subsystem 26. Rather, if there is a 16-bit API function that has the same purpose as a 32-bit API function, the call to the 32-bit API function is typically converted into a call to the equivalent 16-bit API function and handled by the 16-bit subsystem 24. However, if there is no 16-bit API function that has the same purpose as the 32-bit API function, or if the 32-bit API function can be handled more efficiently by the 32-bit subsystem 26, the call to the 32-bit API function is handled directly by the 32-bit subsystem 26. The process of converting a call to a 32-bit API function into a call to an equivalent 16-bit API function and then converting the results of the 16-bit API function back into a 32-bit format is known as "thunking." This process occurs in a 32-bit thunk layer 36, which is code that performs the conversion to and from a 16-bit format. Such a thunk layer is provided by the "MICROSOFT WINDOWS NT" operating system.

Both the 16-bit API and the 32-bit API are implemented as a set of dynamic link libraries ("DLL's"). A DLL is a library module that contains executable code for performing various functions. The code for each function is stored within the DLL. When an application program contains a call to a function within a DLL, the DLL is dynamically linked to the application program at run time. Application programs use the functions in the DLL as if the functions were a part of the application program's code.

The DLL's that form the API's in the present invention are not reentrant. Code that is reentrant is not modifiable during run time and is written so that it can be shared by several threads. If one thread is executing reentrant code and another thread interrupts the execution of the first thread, the second thread can begin or continue execution of the same code without any code sharing or data sharing problems. Thus, more than one thread can be in the process of using a single DLL if the DLL is reentrant. The problem that occurs when a DLL is not reentrant is that the code is modifiable and the same code and data in the DLL are shared among all threads using the DLL. Consequently, if one thread is executing code in a non-reentrant DLL and another thread interrupts the execution of the first thread and attempts to begin or continue execution of the same code in the DLL, there may be code sharing or data sharing problems. Since the DLL's that form the 16-bit API in the present invention are not reentrant and since the operating system 20 includes both a cooperative 16-bit subsystem 24 and a preemptive 32-bit subsystem 26, a mechanism is needed to prevent a second thread from executing a 16-bit API function before a first thread has completed Execution of another 16-bit API function.

The method and system provided by the present invention for protecting the shared code and data in the 16-bit API include a synchronization mechanism in the form of a mutex. Those skilled in the art will appreciate that the present invention may also employ other synchronization mechanisms, such as critical sections or semaphores. A mutex is a data structure that can be used to prevent simultaneous use of a shared resource. In this case, the shared resource is the code and data in the 16-bit API. When a thread wants to use the shared resource, the-thread requests ownership of the mutex. If the mutex is already owned by another thread, the requesting thread is blocked until ownership is released. Otherwise, the requesting thread is granted ownership. In the preferred embodiment of the present invention, the time and manner in which threads request, obtain, and release ownership of the mutex differs for 16-bit threads and 32-bit threads.

Figure 3:
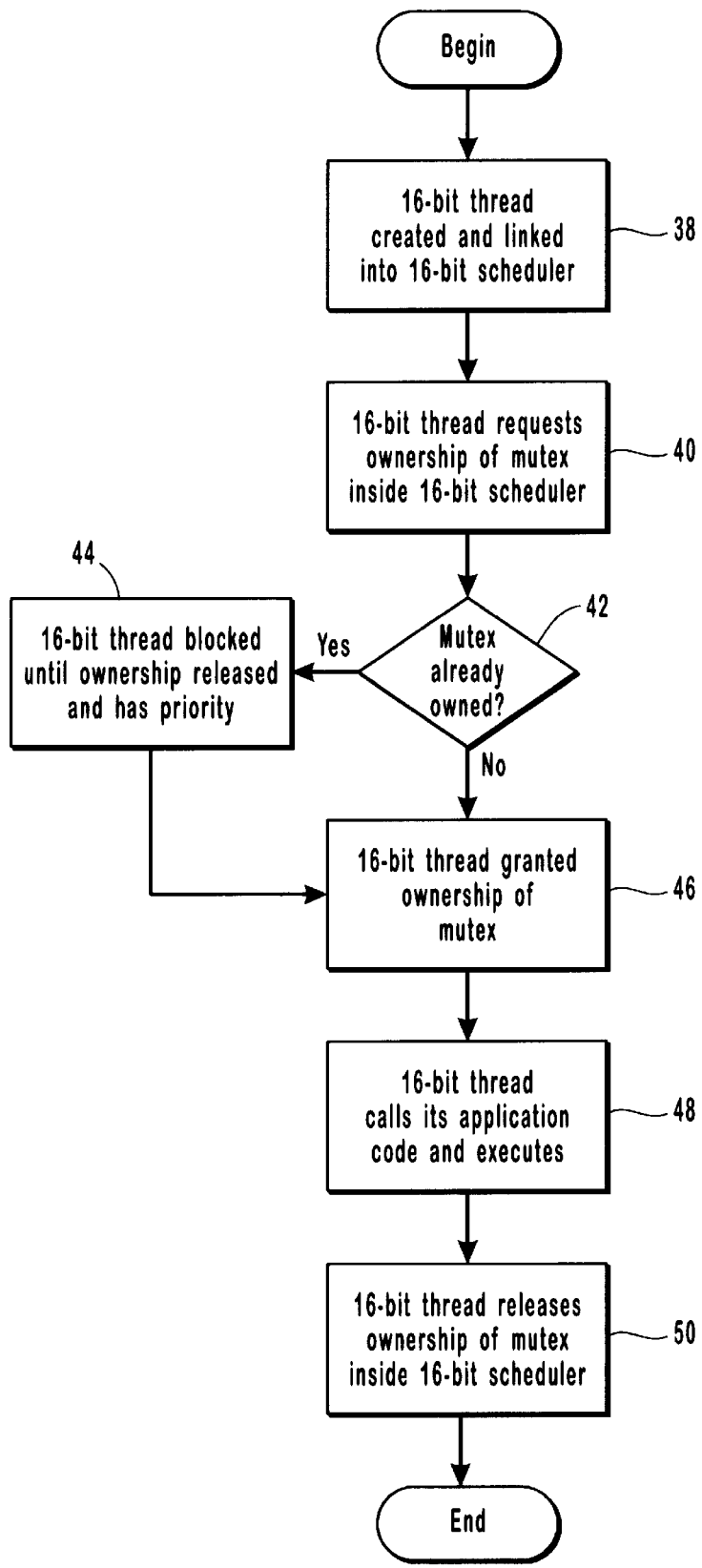
FIG. 3 is a high-level flow chart illustrating how a 16-bit thread requests, obtains, and releases ownership of a mutex in accordance with the preferred embodiment of the present invention.

For 16-bit threads, ownership of the mutex must be requested and obtained before the 16-bit thread calls into its application code. FIG. 3 illustrates the steps that must be performed for a 16-bit thread to request, obtain, and release ownership of the mutex. Initially, when a 16-bit application 28 is started, a 16-bit thread is created and linked into the 16-bit scheduler 32 (step 38). Before the 16-bit thread calls into its application code, the 16-bit thread requests ownership of the mutex inside the 16-bit scheduler 32 (step 40). If the mutex is already owned (step 42), the 16-bit thread is blocked until ownership is released and the thread has priority to execute (step 44). Otherwise, the 16-bit thread is granted ownership (step 46) and calls into its application code and executes (step 48). When the 16-bit thread relinquishes control of the CPU 12 to the 16-bit scheduler 32, the 16-bit thread releases ownership of the mutex, inside the 16-bit scheduler 32 (step 50). While the 16-bit thread owns the mutex, the 16-bit thread can make multiple calls to functions within the 16-bit API. Since no other thread can obtain ownership of the mutex while the 16-bit thread owns the lock, the code and data in the 16-bit API are protected.

Figure 4A:
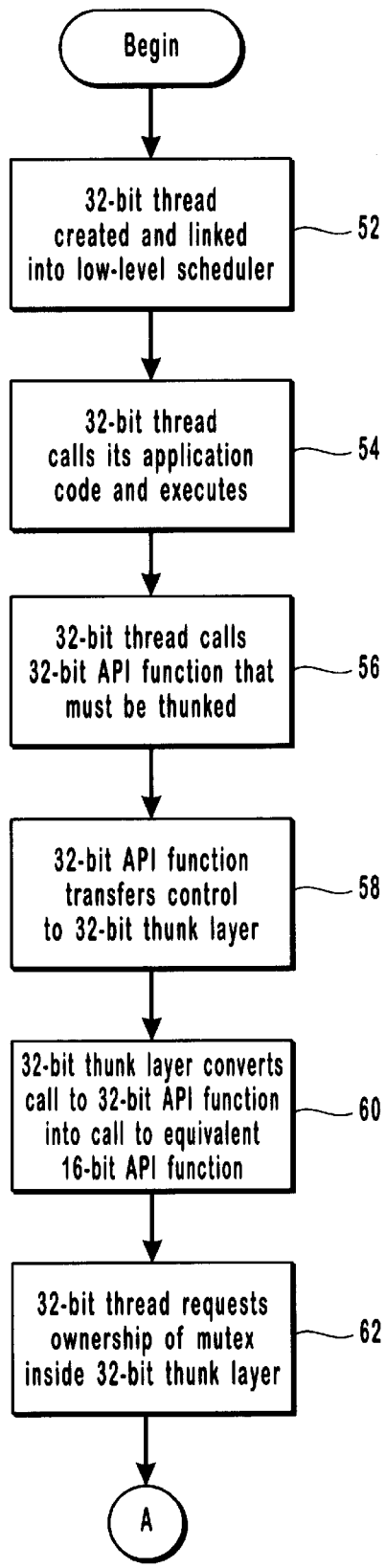
FIGS. 4A and 4B collectively are a high-level flow chart illustrating how a 32-bit thread requests, obtains, and releases ownership of the mutex in accordance with the preferred embodiment of the present invention.
Figure 4B:
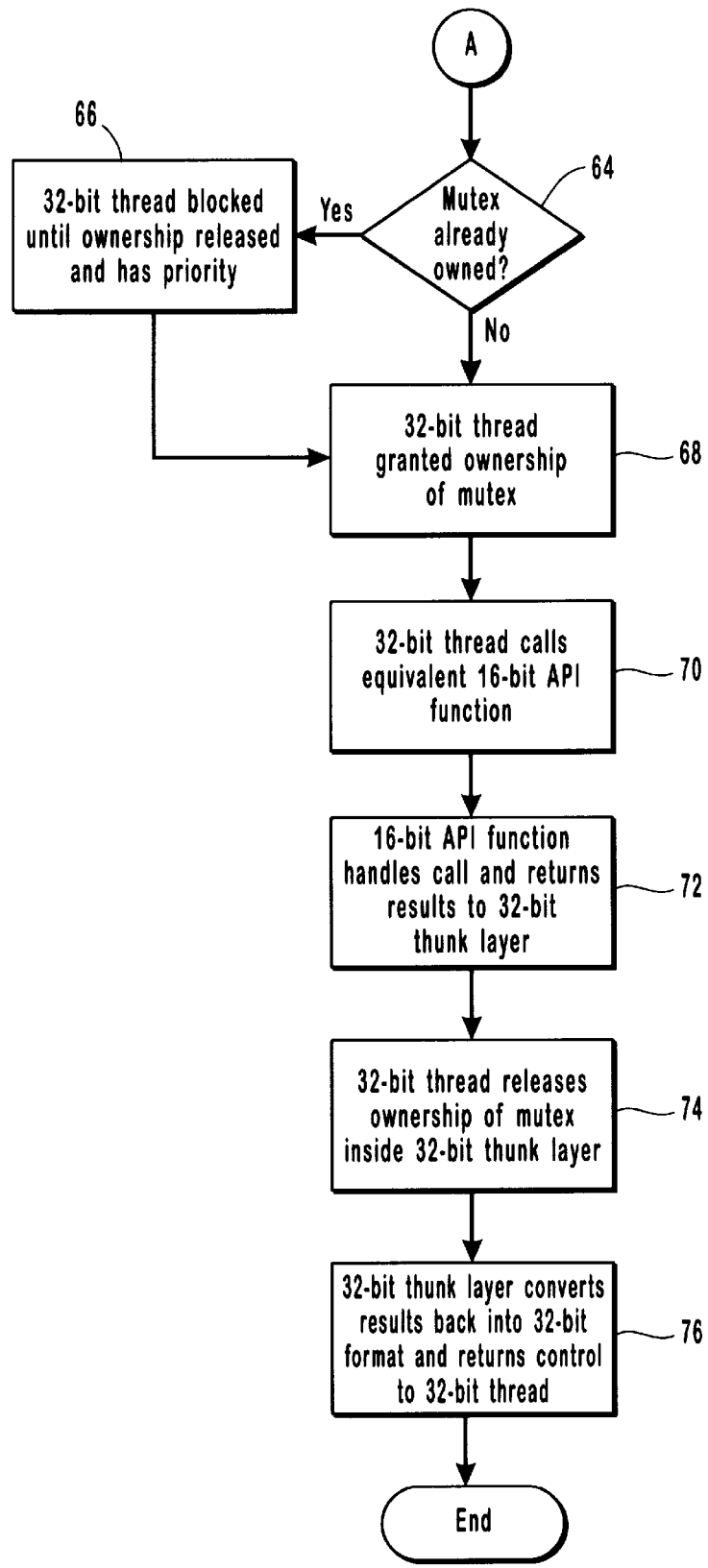

For 32-bit threads, ownership of the mutex must be requested and obtained before a call to a 16-bit API function (that has been thunked from a call to an equivalent 32-bit API function) begins execution. FIGS. 4A and 4B collectively illustrate the steps that must be performed for a 32-bit thread to request, obtain, and release ownership of the mutex. Initially, when a, 32-bit application 30 is started, a 32-bit thread is created and linked into the low-level scheduler 34 (step 52). When the 32-bit thread is assigned control of the CPU 12, the 32-bit thread calls into its application code and executes (step 54). During execution, when the 32-bit thread calls a 32-bit API function that must be thunked (i.e., one that must be converted into a call to an equivalent 16-bit API function) (step 56), the 32-bit API function transfers control to the 32-bit thunk layer 36 (step 58). The 32-bit thunk layer 36 converts the call to the 32-bit API function into a call to the equivalent 16-bit API function (step 60) and the 32-bit thread requests ownership of the mutex inside the 32-bit thunk layer 36 (step 62). If the mutex is already owned (step 64), the 32-bit-thread is blocked until ownership is released and the thread has priority to execute (step 66). Otherwise, the 32-bit thread is granted ownership (step 68) and calls the equivalent 16-bit API function (step 70). The 16-bit API function handles the call and returns the results to the 32-bit thunk layer 36 (step 72) and the 32-bit thread releases ownership of the mutex inside the 32-bit thunk layer 36 (step 74). Lastly, the 32-bit thunk layer 36 converts the results from the 16-bit API function back into a 32-bit format and returns control to the 32-bit thread (step 76). Again, since no other thread can obtain ownership of the mutex while the 32-bit thread owns the lock, the code and data in the 16-bit API are protected.

In the discussion above relating to 32-bit threads, ownership of the mutex is requested after the call to the 32-bit API function has been converted into a call to the equivalent 16-bit API function and is released before the results from the 16-bit API function are converted back into a 32-bit format. Those skilled in the art will appreciate that ownership of the mutex may also be requested before the call to the 32-bit API function has been converted into a call to the equivalent 16-bit API function and be released after the results from the 16-bit API function are converted back into a 32-bit format.

One of ordinary skill in the art will now appreciate that the present invention provides a method and system for protecting shared code and data, in particular, shared system code and data, in a multitasking operating system. The method and system include a synchronization mechanism that protects shared system code and data in the multitasking operating system. The operating system includes a cooperative subsystem and a preemptive subsystem. The cooperative subsystem includes the shared system code and data. Ownership of the synchronization mechanism must be requested and obtained before a cooperatively scheduled thread can execute in the cooperative subsystem. Additionally, ownership of the synchronization mechanism must be requested and obtained before a preemptively scheduled thread can execute the shared system code in the cooperative subsystem. The synchronization mechanism of the present invention provides compatibility in an operating system that includes both a cooperative subsystem and a preemptive subsystem by protecting the shared code and data in the cooperative subsystem from the preemptive capabilities of the preemptive subsystem. Although the present invention has been shown and described with reference to a preferred embodiment, equivalent alterations and modifications will occur to those skilled in the art upon reading and understanding this specification. The present invention includes all such equivalent alterations and modifications and is limited only by the scope of the following claims.

What is claimed is:

1. A method in a computer system for handling a call to an application programming interface routine of a preemptive multitasking subsystem of an operating system, the operating system also having a cooperative multitasking subsystem, comprising:

receiving a call to the application programming interface routine by an application executing in the preemptive multitasking subsystem of the operating system;

determining that the routine is implemented in the cooperative multitasking subsystem;

in response to the receiving and determining steps, thunking the call by:

converting the call to the application programming interface routine in the preemptive multitasking subsystem into a call to the implementation of the application programming interface routine in the cooperative multitasking subsystem;

obtaining ownership of a synchronization mechanism regulating the invocation of all application programming interface routine implementations in the cooperative multitasking subsystem; and only after ownership of the synchronization mechanism has been obtained, calling the implementation of the application programming interface routine in the cooperative multitasking subsystem using the converted call.

2. The method of claim 1 wherein the application executing in the preemptive multitasking subsystem has no functionality for directly requesting ownership of the synchronization mechanism.

3. The method of claim 1 wherein the thunking steps are performed by a thunk layer of the operating system, and wherein the method further comprises:

receiving a second call to the application programming interface routine by a second application executing in the preemptive multitasking subsystem of the operating system; and in response to the step of receiving the second call, thunking the second call under the control of the thunk layer.

4. The method of claim 1 wherein the implementation of the application programming interface routine in the cooperative multitasking subsystem is reentrant.

5. The method of claim 1 wherein the calling step is conditioned on the completion of the obtaining step irrespective of the reentrancy or nonreentrancy of the implementation of the application programming interface routine in the cooperative multitasking subsystem.

6. A computer-readable medium whose contents cause a computer system to handle a call to an application programming interface routine of a preemptive multitasking subsystem of an operating system, the operating system also having a cooperative multitasking subsystem, by:

receiving a call to the application programming interface routine by an application executing in the preemptive multitasking subsystem of the operating system;

determining that the routine is implemented in the cooperative multitasking subsystem;

in response to the receiving and determining steps, thunking the call by:

converting the call to the application programming interface routine in the preemptive multitasking subsystem into a call to the implementation of the application programming interface routine in the cooperative multitasking subsystem;

obtaining ownership of a synchronization mechanism regulating the invocation of all application programming interface routine implementations ih the cooperative multitasking subsystem; and only after ownership of the synchronization mechanism has been obtained, calling the implementation of the application programming interface routine in the cooperative multitasking subsystem using the converted call.

7. The computer-readable medium of claim 6 wherein the application executing in the preemptive multitasking subsystem has no functionality for directly requesting ownership of the synchronization mechanism.

8. The computer-readable medium of claim 6 wherein the thunking steps are performed by a thunk layer of the operating system, and wherein the contents of the computer-readable medium further cause the computer system to perform the steps of:

receiving a second call to the application programming interface routine by a second application executing in the preemptive multitasking subsystem of the operating system; and in response to the step of receiving the second call, thunking the second call under the control of the thunk layer.

9. The computer-readable medium of claim 6 wherein the implementation of the application programming interface routine in the cooperative multitasking subsystem is non-reentrant.

10. The computer-readable medium of claim 6 wherein the calling step is conditioned on the completion of the obtaining step irrespective of the reentrancy or nonreentrancy of the implementation of the application programming interface routine in the cooperative multitasking subsystem.

11. A computer-readable medium having computer-executable instructions which are configured to, when executed, implement a thunk layer for handling a call to an application programming interface routine of a preemptive multitasking subsystem of an operating system that is implemented in the cooperative multitasking subsystem, the operating system also having a cooperative multitasking subsystem, comprising:

a call receiver that received a call to the application programming interface routine by an application executing in the preemptive multitasking subsystem of the operating system;

a call converter that converts the call to the application programming interface routine in the preemptive multitasking subsystem into a call to the implementation of the application programming interface routine in the cooperative multitasking subsystem;

a synchronization mechanism regulating the invocation of all application programming interface routine implementations in the cooperative multitasking subsystem; and a call initiator that calls the implementation of the application programming interface routine in the cooperative multitasking subsystem using the converted call only after ownership of the synchronization mechanism has been obtained.

12. A computer system having a computer-readable medium whose contents cause the computer system to handle a call to an application programming interface routine of a preemptive multitasking subsystem of an operating system, the operating system also having a cooperative multitasking subsystem, comprising:

a call receiver adapted to receive a call to the application programming interface routine by an application executing in the preemptive multitasking subsystem of the operating system and determine whether the routine is implemented in the cooperative multitasking subsystem;

a thunk layer adapted to, where the call received by the call receiver is determined to be implemented in the cooperative multitasking subsystem, thunk the call by:

converting the call to the application programming interface routine in the preemptive multitasking subsystem into a call to the implementation of the application programming interface routine in the cooperative multitasking subsystem;

obtaining ownership of a synchronization mechanism regulating the invocation of all application programming interface routine implementations in the cooperative multitasking subsystem; and only after ownership of the synchronization mechanism has been obtained, calling the implementation of the application programming interface routine in the cooperative multitasking subsystem using the converted call.

13. The computer system of claim 12 wherein the contents of the computer-readable medium cause the thunk layer to call the implementation of the application programming interface routine in the cooperative multitasking subsystem using the converted call in response to completely obtaining ownership of a synchronization mechanism regulating the invocation of all application programming interface routine implementations in the cooperative multitasking subsystem irrespective of the reentrancy or nonreentrancy of the implementation of the application programming interface routine in the cooperative multitasking subsystem.

* * * * *